US009069731B2

(12) United States Patent
Stern et al.

(10) Patent No.: US 9,069,731 B2
(45) Date of Patent: Jun. 30, 2015

(54) SYSTEM AND METHOD FOR PROVIDING ONLINE VERSIONS OF PRINT-MEDIUM PUBLICATIONS

(75) Inventors: Yonatan P. Stern, Sde Warburg (IL); Emil Shteinvil, Kfar-Saba (IL)

(73) Assignee: Olive Software Inc., Aurora, CO (US)

( * ) Notice: Subject to any disclaimer, the term of this patent is extended or adjusted under 35 U.S.C. 154(b) by 392 days.

(21) Appl. No.: 12/980,367

(22) Filed: Dec. 29, 2010

(65) Prior Publication Data

US 2011/0161806 A1 Jun. 30, 2011

Related U.S. Application Data

(60) Provisional application No. 61/365,820, filed on Jul. 20, 2010, provisional application No. 61/290,550, filed on Dec. 29, 2009.

(51) Int. Cl.
*G06F 17/00* (2006.01)
*G06F 17/21* (2006.01)
*G06F 17/22* (2006.01)

(52) U.S. Cl.
CPC ...... *G06F 17/211* (2013.01); *G06F 2206/1512* (2013.01); *G06F 17/2264* (2013.01)

(58) Field of Classification Search
CPC .............. G06F 17/211; G06F 17/2264; G06F 2206/1512
USPC .......................................... 715/242–273, 788
See application file for complete search history.

(56) References Cited

U.S. PATENT DOCUMENTS

| 5,742,815 A | 4/1998 | Stern |
| 5,867,112 A | 2/1999 | Kost |
| 5,893,127 A | 4/1999 | Tyan et al. |
| 5,907,837 A | 5/1999 | Ferrel et al. |
| 5,953,733 A | 9/1999 | Langford-Wilson |
| 5,963,966 A * | 10/1999 | Mitchell et al. ............... 715/236 |

(Continued)

FOREIGN PATENT DOCUMENTS

| EP | 1484697 | 12/2004 |
| WO | WO 99/50763 | 10/1999 |

(Continued)

OTHER PUBLICATIONS

Carina et al., "From Print to Web to E-Paper—The Challenge of Designing the E-Newspaper" pp. 1-12—no date.*

(Continued)

*Primary Examiner* — Quoc A Tran

(57) ABSTRACT

Apparatus and method for automatic adaptation of an image of a print page into a version suitable for an electronic screen. An input obtains an electronic image of a page of the print publication, the page comprising items, such as headlines, images and articles, arranged in a print version layout. A layout parser parses the page layout, the parsing comprising identifying the items arranged therein, including identifying boundaries of the items within the layout, and text belonging to the items. A text sizing unit selects text sizes for respective items to render the items readable when the text is shown on screen as part of the page. The resized text may no longer fit into the boundaries so a text flowing unit flows text of the item dynamically, thereby to provide an electronic screen version of the image of the page, the screen version retaining the print version layout and having text sized to be readable when shown on a screen.

20 Claims, 15 Drawing Sheets

(56) References Cited

U.S. PATENT DOCUMENTS

| | | | |
|---|---|---|---|
| 5,991,515 | A | 11/1999 | Fall et al. |
| 6,023,714 | A | 2/2000 | Hill et al. |
| 6,088,708 | A | 7/2000 | Burch et al. |
| 6,161,107 | A | 12/2000 | Stern |
| 6,185,589 | B1 | 2/2001 | Votipka |
| 6,199,082 | B1 | 3/2001 | Ferrel et al. |
| 6,230,173 | B1 | 5/2001 | Ferrel et al. |
| 6,233,592 | B1 | 5/2001 | Schnelle et al. |
| 6,313,854 | B1 | 11/2001 | Gibson |
| 6,324,554 | B1 | 11/2001 | Watanabe et al. |
| 6,330,574 | B1 | 12/2001 | Murashita |
| 6,336,124 | B1 | 1/2002 | Alam et al. |
| 6,377,704 | B1 | 4/2002 | Cooperman |
| 6,507,856 | B1 | 1/2003 | Chen et al. |
| 6,587,583 | B1 | 7/2003 | Kurzweil et al. |
| 6,691,281 | B1 | 2/2004 | Sorge et al. |
| 6,708,189 | B1 | 3/2004 | Fitzsimons et al. |
| 6,708,309 | B1 | 3/2004 | Blumberg |
| 6,731,814 | B2 | 5/2004 | Zeck et al. |
| 6,938,051 | B1 | 8/2005 | Burger et al. |
| 6,992,782 | B1 | 1/2006 | Yardumian et al. |
| 7,069,508 | B1* | 6/2006 | Bever et al. .................. 715/234 |
| 7,145,676 | B2 | 12/2006 | Fan |
| 7,167,270 | B2 | 1/2007 | Silverbrook et al. |
| 7,600,183 | B2 | 10/2009 | Stern et al. |
| 2001/0042078 | A1 | 11/2001 | Anwar |
| 2002/0029232 | A1 | 3/2002 | Bobrow et al. |
| 2002/0116421 | A1* | 8/2002 | Fox et al. ...................... 707/526 |
| 2002/0188635 | A1* | 12/2002 | Larson ........................ 707/515 |
| 2003/0014445 | A1* | 1/2003 | Formanek et al. ........... 707/526 |
| 2003/0020050 | A1 | 1/2003 | Heintzenberg et al. |
| 2003/0140315 | A1 | 7/2003 | Blumberg et al. |
| 2003/0200507 | A1* | 10/2003 | Stern et al. .................. 715/517 |
| 2003/0220905 | A1 | 11/2003 | Amado et al. |
| 2004/0139400 | A1* | 7/2004 | Allam et al. ................. 715/526 |
| 2004/0217979 | A1* | 11/2004 | Baar et al. .................... 345/660 |
| 2005/0046901 | A1 | 3/2005 | Silverbrook et al. |
| 2005/0055420 | A1 | 3/2005 | Wyler |
| 2005/0144256 | A1 | 6/2005 | Blumberg |
| 2005/0288943 | A1* | 12/2005 | Wei et al. ......................... 705/1 |
| 2008/0082903 | A1* | 4/2008 | McCurdy et al. ............ 715/200 |
| 2011/0041051 | A1* | 2/2011 | Taylor .......................... 715/229 |

FOREIGN PATENT DOCUMENTS

| | | |
|---|---|---|
| WO | WO 01/13287 | 2/2001 |
| WO | WO 01/98948 | 12/2001 |

OTHER PUBLICATIONS

Official Action Dated Feb. 5, 2008 From the US Patent and Trademark Office Re.: U.S. Appl. No. 10/449,059.
Official Action Dated Feb. 21, 2007 From the US Patent and Trademark Office Re.: U.S. Appl. No. 09/714,207.
Official Action Dated Feb. 22, 2007 From the US Patent and Trademark Office Re.: U.S. Appl. No. 10/449,059.
Official Action Dated Jun. 22, 2006 From the US Patent and Trademark Office Re.: U.S. Appl. No. 09/714,207.
Official Action Dated Aug. 23, 2007 From the US Patent and Trademark Office Re.: U.S. Appl. No. 10/449,059.
Official Action Dated Oct. 25, 2007 From the US Patent and Trademark Office Re.: U.S. Appl. No. 09/714,207.
Official Action Dated Oct. 27, 2008 From the US Patent and Trademark Office Re.: U.S. Appl. No. 10/449,059.
Partial European Search Report Dated Jan. 20, 2006 From the European Patent Office Re.: Application No. 04076587.7.
Notice of Allowance Dated May 21, 2009 From the US Patent and Trademark Office Re.: U.S. Appl. No. 10/449,059.
Official Action Dated Nov. 1, 2006 From the US Patent and Trademark Office Re.: U.S. Appl. No. 10/449,059.
Official Action Dated Feb. 15, 2006 From the US Patent and Trademark Office Re.: U.S. Appl. No. 10/449,059.
Official Action Dated Aug. 17, 2005 From the US Patent and Trademark Office Re.: U.S. Appl. No. 10/449,059.
Altamura "Wisdom++: An Interactive and Adaptive Document Analysis System", ICDAR '99: 366-369, 1999. Section 1. Abstract.
Crouse et al. "Joint Thresholding and Quantizer Selection for Transform Image Coding: Entropy-Constrained Analysis and Applications to Baseline JPEG", IEEE Transactions on Image Processing, 6(2): 285-297, Feb. 1997.
Dail "ActivePaper XML Structure in Brief", Internet Article 'Online! Retrieved From the Internet: URL: http://www.1fnet.it/oclc/olive/olive_ActivePaper_XML_structure.doc>, 2002.
Hong et al. "Representing OCRed Documents in HTML", ICDAR II: 831-834, 1997. Section 2. Abstract.
Kopec "Document Image Decoding in the Berkeley Digital Library", Proceedings of the International Conference on Image Processing, 1(2): 769-772, 1996. Abstract.
Matthews et al. "Creating Graphics for FrontPage Webs", FrontPage 2000, Chap.5: 214-237, 1999.
Rogers et al. "The ISL Document Image Analysis Toolbox", DIA '97: 18-25, 1997. Sections 2.1, 3.1, 4.1-4.5, 5. Abstract.
Said et al. "A New, Fast, and Efficient Image Codec Based on Set Partitioning in Hierarchical Trees", IEEE Transactions on Circuits and Systems for Video Technology, 6(3): 243-250, Jun. 1996.
Taubman "High Performance Scalable Image Compression With EBCOT", IEEE Transactions on Image Processing, 9(7): 1158-1170, Jul. 2000.
Worring et al. "From Linear to Non-Linear Reading: A Case Study to Provide Internet Access to Paper Documents", ICDAR, II: 273-277, 1997. Sections 2, 3, 5, 6.

\* cited by examiner

SYSTEM AND METHOD FOR PROVIDING ONLINE VERSIONS OF PRINT-MEDIUM PUBLICATIONS

This application claims the benefit of priority under 35 USC 119(e) of U.S. Provisional Patent Applications Nos. 61/365,820 filed on Jul. 20, 2010, and 61/290,550 filed on Dec. 29, 2009.

This application also incorporates by reference U.S. Pat. No. 7,600,183 issued on Oct. 6, 2009 (Publication No.: 2003-0200507-A1 published on Oct. 23, 2003).

The contents of the above applications are incorporated herein by reference in their entirety.

FIELD OF THE INVENTION

The present invention relates generally to the field of adaptation of print publications for the electronic media, for example for use on the Internet.

BACKGROUND OF THE INVENTION

In the current art there are two principle methods of republishing printed media for electronic use, say in the web. A first method uses the exact layout of the print page, and thus reproduces the print page on the screen. A searchable print replica is produced, often in portable document format (pdf). This has the disadvantage that most of the material is actually unreadable because the text is too small. If the material is to be read then the page has to be zoomed so that most of the page is not visible, and following articles in order is difficult.

A second method involves reorganizing the layout of the publication. A new screen-friendly layout is generated which allows for complete screen views which are readable. However the original layout, an expensive editorial asset, is dispensed with, and considerable cost goes into designing the new layout.

For a typical newspaper, retaining the print layout is desirable, and helps to attract readers who are used to the print layout to use the Internet version.

However for glossy magazines, the relationship between the text and the photographs is generally considered to be part of the essence of the magazine. Glossy magazines lose their essence if they go for a new screen-friendly layout, and yet retaining the print version makes them unreadable. It is for this reason that glossy magazines have made very use of the Internet environment to date.

Most newspapers follow the screen-friendly approach for their on-line editions. Except, perhaps, for the logo and banner letterhead of most print-medium publications, most prior art online publications, such as newspapers, journals, and magazines make no effort to adhere to their original and well-recognized print-medium page layout on their websites. Readers used to the print versions of these publications may be discouraged and turned off from becoming online readers unless they can quickly adapt to the broad scope and hypertext style of their favorite print publications.

If retaining the print layout, then clearly previewing an entire page at a glance and at a size which permits convenient reading is nearly impossible or, at best, requires zooming and heavy use of navigation tools as are commonly used in reading online text. Furthermore, navigation tools, used to browse prior-art web-pages representing a print-edition online, are not utilized to the best extent possible. The paradox is that if you scale a print-medium page to be fully viewable on-screen, the text is of a size to be virtually unreadable. On the other hand, if you scale it in—that is, enlarge the web-page by zooming—you can then read the text, but portions of the page will not be visible on screen and articles and advertising of possible interest will be lost from view.

Online newspapers and periodicals which maintain printeditions, generally provide a reader with a Table of Contents (ToC), section headers, and/or headlines from the original print-medium edition, but these alone usually do not give the reader enough information to make a reasoned choice of what to read. Captioned titles often do not give a reader enough information or a clear idea of what an article is about. Also, a ToC does not indicate whether an article is short or long, or whether it is positioned in a central place on a page or in a corner. A reader may not have the time, or may not particularly want to read a long article. The position of an article may indicate its importance, but a reader would not know that from a typical website ToC until actually calling up the article and reading it. By contrast in the print edition the relative importance may be very clear.

Furthermore, there may often be no indication in the online ToC as to whether the indicated article is presented on a single page or on multiple pages, the latter extending the time it takes to read an article and requiring navigating to a new web-page in the middle of reading. Finally, a ToC sometimes does not indicate if there is a photo to accompany a particular article, important information for some readers. All these factors are disadvantages of ToCs as currently used in webbased publishing.

For example, The New York Post online includes a comprehensive Table of Contents (ToC) displayed in fine print at the end of the homepage for users to browse by clicking on selected sections or features. In the first place, the small print makes it hard to read the list to begin with. Furthermore, the items, being broad descriptors, only give a very general idea of the contents to be had when navigating to a particular article page.

The Los Angeles Times on their website goes a step further and includes a link to a print edition which is displayed in a new window, but difficult to read itself unless a reader navigates to other web-pages where individual articles are enlarged.

The major articles and feature elements in the online webpage edition are captioned and have hypertext links to the full text, but do not give the same overview as the display of the print edition front page.

Other online web editions of print-medium publications provide their readers with an option to link to their print editions, but the editions may only have a vague resemblance to the original or only be symbolic. An example is the Chicago Tribune website (www.chicagotribune.com) illustrated in FIGS. 1a/b, which displays a thumbnail image of the front page of its original, print-medium newspaper and a parallel list of captioned text articles based on the thumbnail image to browse. Browsing involves clicking and navigating to another web-page where the text of the individual article is readable in full.

SUMMARY OF THE INVENTION

According to one aspect of the present invention there is provided apparatus for providing an electronic screen version of a print publication, the electronic screen version being adapted for reading from a screen, the apparatus comprising an electronic processor, the electronic processor comprising:

an input for obtaining an electronic image of a page of said print publication, the page comprising a plurality of items arranged in a print version layout;

a layout parser adapted to parse said page layout, said parsing comprising identifying said items arranged therein, said identifying comprising identifying boundaries of said items within said layout, and text belonging to said items;

a text sizing unit adapted to select text sizes for respective items, said sizes to render said items to be readable when the text is shown on screen as part of said page, and a text flowing unit adapted to flow text of a respective item on said page at said selected size into item boundaries of said item, thereby to provide an electronic screen version of said image of said page, said screen version retaining said print version layout and having text sized to be readable when shown on a screen.

In an embodiment, said text sizing unit is configured to use feedback from an end user indicating an end user screen size, in order to select a text sized for a respective end user screen.

In an embodiment, said item boundaries are said identified boundaries and said text flowing unit is adapted to fill said respective identified boundaries of a given item with text, and to retain remaining text associated with said respective item for later flowing into said boundaries following user interaction.

In an embodiment, said user interaction comprises scrolling.

In an embodiment, said user interaction comprises hovering over said given item with a cursor.

In an embodiment, said text flowing unit is adapted to enlarge respective identified boundaries of a given item in response to interaction with a user, and said item boundaries into which said text is flowed are said enlarged boundaries.

An embodiment may comprise an image flowing unit, adapted to show a subset of images of a respective image item on said page at a selected size within corresponding boundaries and to exchange said subset with other images of said image item following user interaction with said item.

In an embodiment, said page is a newspaper page and said plurality of items comprise each of headlines, pictures and articles.

In an embodiment, said articles comprise body text and captions and wherein text belonging to each one of body text and captions are arranged for reflowing according to respectively different predetermined rules.

In an embodiment, said articles comprise body text and captions and wherein text belonging to each one of body text and captions are assigned respective sizes according to respectively different predetermined rules.

According to a second aspect of the present invention there is provided a computerized method for converting an image of print version of a page to a screen version of said page, the screen version being adapted for reading from an electronic screen, method comprising:

obtaining an electronic image of a page of said print publication, the page comprising a plurality of items arranged in a print version layout;

parsing said page layout, said parsing comprising identifying said items arranged therein, said identifying comprising identifying image boundaries of said items within said layout, and text belonging to said items;

selecting text sizes for respective items, said sizes to render said items to be readable when the text is shown on screen as part of said page, and flowing text of a respective item on said page at said selected size into item boundaries, thereby to provide an electronic screen version of said image of said page, said screen version retaining said print version layout and having text sized to be readable when shown on a screen.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

The term "entity" is used herein to refer to such items as an article, photo, table, or advertisement. Horizontal and vertical lines and text boxes, as commonly used in print-media publications to segregate and define textual areas, are integrally associated with their entities. The process of designating or assigning such areas to reconstitute a print-medium page when preparing a reflow of an entity is called "segmenting." Reference coordinates are assigned to each entity for reflow which define their disposition and location on a web-page of the reconstituted web-based copy of an original print-medium publication. The term "segmented area" hereinafter refers to the designation of the space on a page assigned to distinct body-text, graphic elements, or photos.

The term, "logical element" hereinafter refers to a component logically and closely associated with or related to an entity, such as a headline, a title, a subtitle, a photo caption, and a credit or byline for an article.

Hereinafter, the term "banner header" is used to refer to a line of text in oversize font, generally comprising a proprietary logo associated with and usually found at the top of the front page of a print-medium newspaper.

It should be noted that the term "web-page" refers to any document written in a markup language including, but not limited to, HTML (Hyper-Text Markup Language) or VRML (Virtual Reality Modeling Language), dynamic HTML, or XML (Extendible Markup Language), or related computer languages thereof, as well as to any collection of such documents reachable through one specific Internet address or at one specific World Wide Web site, or any document obtainable through a particular URL (Uniform Resource Locator). Hereinafter, the term "web-site" refers to at least one web-page, and preferably a plurality of web-pages, virtually connected to form a coherent group.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2a is a view of the upper portion of a typical front-page from an original, print-medium newspaper, by way of example;

FIG. 2b is a screen-shot of the newspaper from FIG. 2a after reflow, shown side-by-side for comparison purposes with FIG. 2a;

FIG. 6 is a screen-shot of a typical article displayed in a new zoomed window illustrating an alternate method of reading from the online newspaper of FIG. 4a.

DESCRIPTION OF THE PREFERRED EMBODIMENTS

Figure 1A:
FIG. 1a is a screen-shot of a GUI (Graphic User Interface), by way of example, for a typical web-edition of a print-medium newspaper publication as in the prior art.

The present invention relates generally to the field of adaptation of print publications for the electronic media, for example for use on the Internet, and more particularly but not exclusively for enhancing readability of a print-medium publication when displayed as a webpage in its original print layout.

A newspaper page consists of multiple items, Banner, headlines, sub-headlines, by-lines, articles and images, all in a layout on the page which is often distinctive to the publication. In general, since a newspaper page is larger than a computer screen, retaining the original layout makes the page unreadable unless the page is zoomed, but then only part of the page is visible and reading is difficult. Thus, instead of zooming and scrolling the entire page, as in some web-page browsers or PDF files or "electronic books," the present embodiments may provide all of the items of the page in the same location in the page layout, but with the text resized to be readable. Some of the text is hidden due to the resizing and the embodiments may use combinations of enlargement of the indicated region and in-segment scrolling, to reveal the hidden text. That is to say the initial display page may show a readable portion of text but not the whole text of the article due to the necessary resizing of the text. However via a user interaction with the item to be read, for example a mouse-over motion—i.e., hovering the mouse over a specific point on a webpage—or by a single click on a navigation symbol, a text scroll function or a region enlargement action may reveal the currently hidden parts of the text.

The present embodiments may provide a user with the ability to call up alternate photographs online within the same assigned space on a page as occupied by an original photograph. Additional photos on the same topic as the one displayed for viewing can be seen with a single click, for example without loss or reduction in size of other elements and text on display on the same web-page. Thus the multimedia capability of the Web is exploited to further enhance the reading experience.

This ability for reflow and multimedia capability may allow print-medium publications, such as newspapers, to extend the appeal of their printed editions, whether current or historic, to the Web.

Accordingly, the present embodiments may provide a system and a method for providing readable web-based publications which also replicate their print-medium counterparts by incorporating the corresponding layout.

The present embodiments may further display a webpage replicating the layout of an original, print-medium publication page wherein all visible text is readable on the screen, and wherein the layout includes the original page features such as article titles, subtitles, names of authors/editors, picture captions, and body-text, in their original layout.

The present embodiments may further provide a reflow engine for flowing text through item boundaries.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1a is a screen-shot of a typical web-edition of a print medium newspaper publication as in the prior art.

Web-page 20, including the words "web edition," is a specially designed screen friendly layout which shows very little, if any, resemblance to the corresponding print-medium publication upon which it is based. Due to the need for readability, most text items on the page are very short and are not whole articles. A central headline 24 focuses on the main news item of the day, but has only a brief description of the topic. More details can only be read by user interaction with the GUI.

Photos and accompanying photo captions are generally provided in most online editions of print-medium publications and are shown at various locations over the webpage in FIG. 1a. A user clicks to read a selected item, whether text or photo.

A topic index 26 is provided in a column on the left side of the webpage. Items listed include: news, sports, entertainment, weather and the like. In respect to the web-page format, unlike a print-medium publication, special services—comprising newspaper services, information resources, video and multimedia features and the like—are also included in the sidebar index to take advantage of the multi-media potential of the web.

Figure 1B:
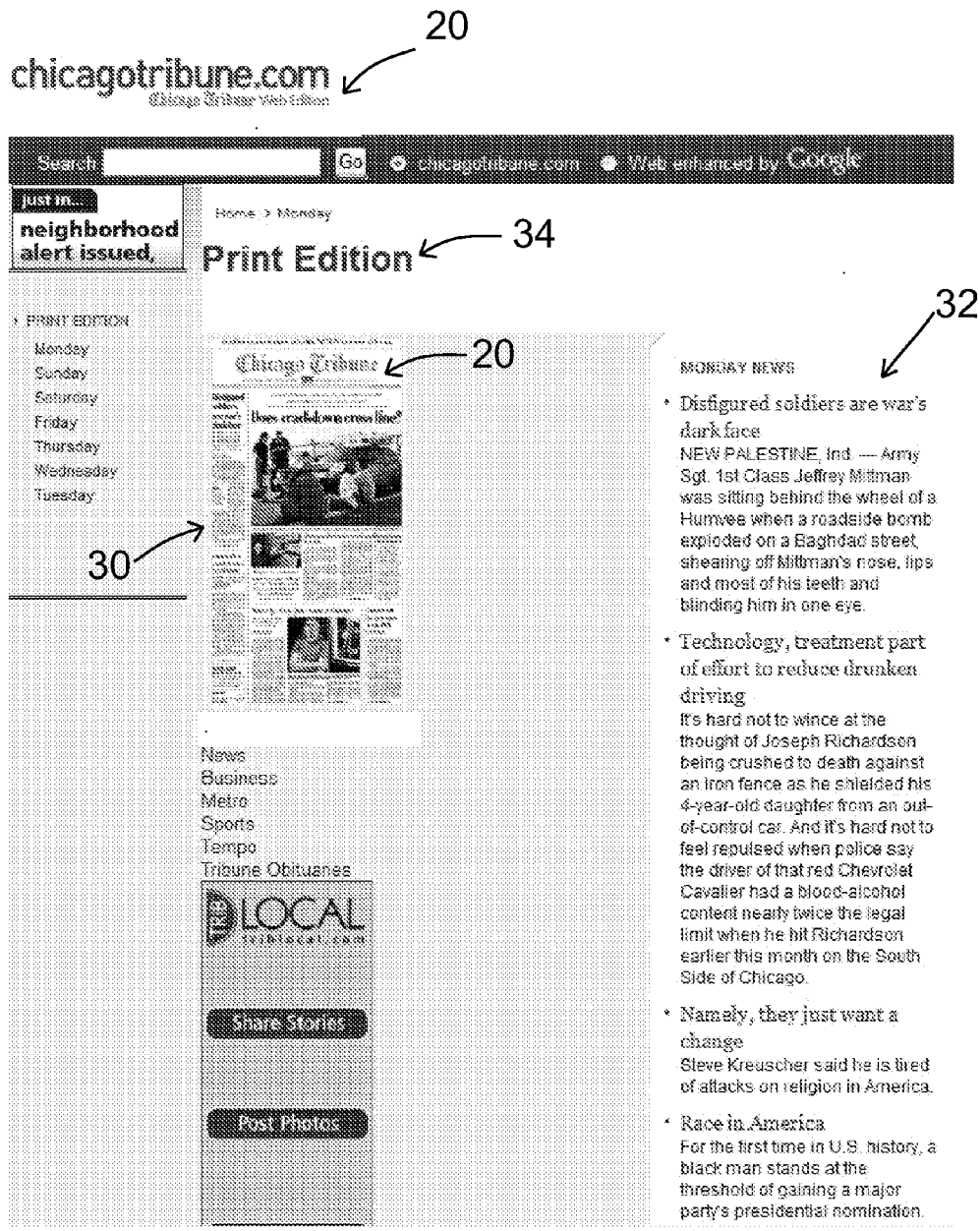
FIG. 1b shows a screen-shot of the print-edition web-page of the newspaper of FIG. 1a, as in the prior art.

A link "Today's paper" 28 leads to another webpage on the newspaper website showing a version of the print edition of the paper, an example being shown in FIG. 1b.

FIG. 1b is a screen-shot of the print-edition web-page from the newspaper of FIG. 1a as in the prior art. A thumbnail image of the newspaper page is too small to read and is not intended to be used directly. A list of news articles 32 with short summaries of the contents is arranged as columnar text on the right hand side of the thumbnail image 30 of the original, full print-medium publication. The list 32 is the version that the user generally actually reads.

The items in column 32 are abbreviated articles. The webpage is labeled 34 as an online Print Edition above the thumbnail-image 30 which carries the traditional print-medium logo 20 of the newspaper. When uploaded into either the web-edition shown in FIG. 1a or the "print edition" of FIG. 1b, different layouts are used which do not share the layout or the look-and-feel of the original print-medium publication. The only resemblance to the original print-medium newspaper is thumbnail image 30. The news and information provided in the online edition are taken from the issue shown in the thumbnail image 30 of the front page.

The print layout itself is difficult to read, primarily due to that the text size when proportionally displayed online within the limitations of the screen and the web-page display.

The list of abbreviated articles 32 is accessible by scrolling down, but this makes it difficult to skim quickly. Furthermore, each item has only one to nine lines of text. These abbreviated articles 32—mere encapsulations—may be browsed in full or scrolled through in order to find a particular item of interest. Furthermore, a user is required to click to obtain the remainder of the article. On the left of thumbnail image 30 is an alternative menu arranged according to the newspaper edition for each day of the week of the print edition. Below thumbnail 30 is a menu arranged by major section headings, such as news, business, and sports. A user clicks on a day of the week or on a topic of interest in the sidebar indexes to read a section or article on a new page. The indexes displayed do not give a reader more than a very general idea, at the most, of the content to be read.

Reference is now made to FIGS. 2a and 2b which show a print page image and a corresponding adapted page according to the present embodiments.

FIG. 2a is a view of the upper portion of a typical front-page from an original, print-medium newspaper. As with the prior art in general, when the layout of FIG. 2a is sized for the screen it is very difficult to read.

The traditional logo-banner 38 is well-known to readers of the publication in the print-medium.

FIG. 2b illustrates the same page after adaptation using the present embodiments. The exact layout of FIG. 2a has been retained, but the text is resized to be readable. Of course due to the resizing of the texts, but not of their corresponding regions, not all of the text can be visible at the same time. The embodiment thus provides regions through which text flows, rather than absolute and fixed text. Simple user interactions however can allow text flow to reveal later text in the article.

The text size may be selected arbitrarily to fit standard screens, or the end user may provide a screen size so that a customized text size can be provided for the individual user.

Figure 3A:
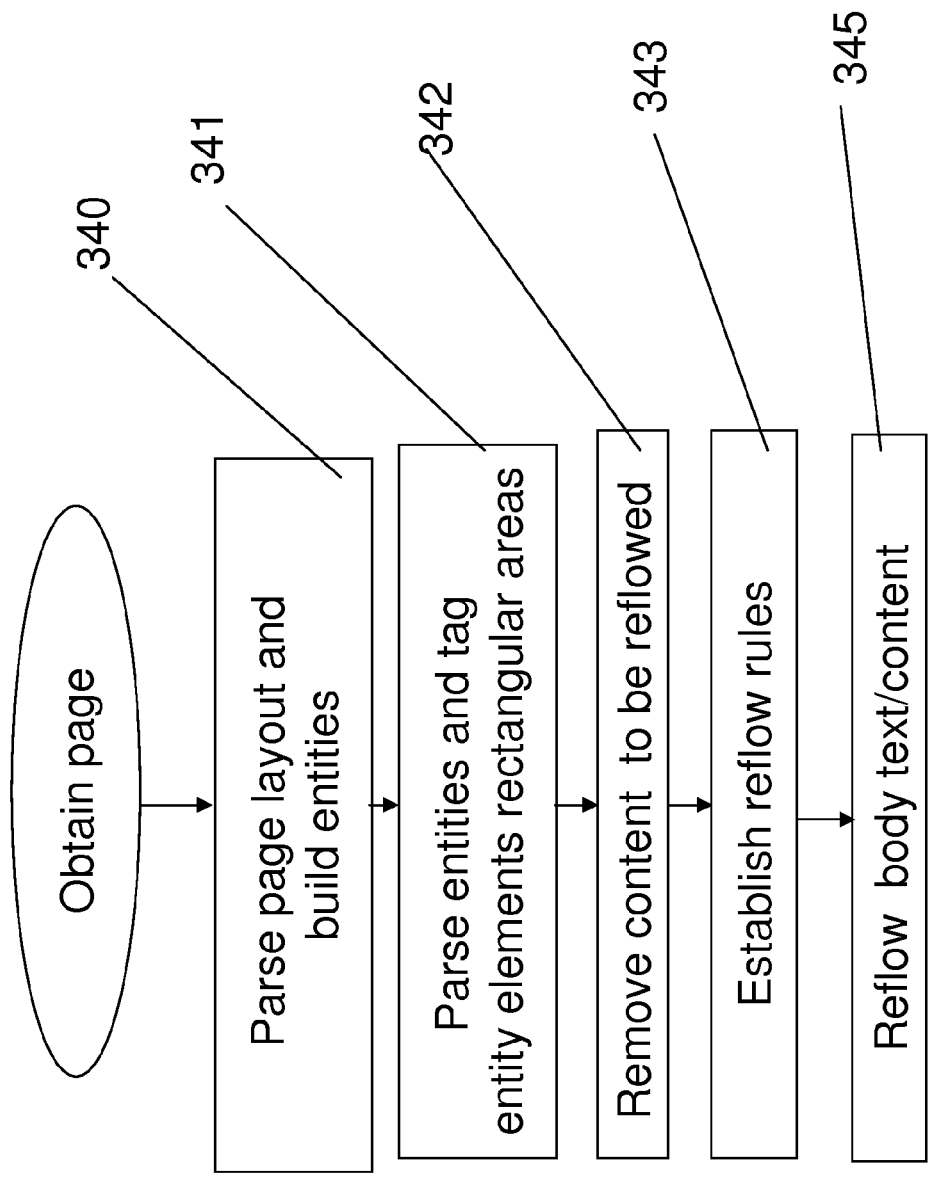
FIG. 3A shows stages in a flow chart of the method of the present embodiments applied to a newspaper.

Referring now to FIG. 3A, in a preliminary step leading to the reflow process, an original, print-medium page of a publication, by way of example, a newspaper, is received in a digital file format ready to print—for example PDF or PostScript.

The layout is then processed so that the layout can be parsed. Thus different page items, headlines, sub-headlines, bylines, pictures, and article bodies, are identified. The identification may particularly concern finding the respective boundaries of the items. Further the identified items may be grouped together into different articles.

The text belonging to each item may be identified.

The text may then be resized to be visible on the screen. A reflow engine then fills the boundary with as much of the resized text as will fit. The remaining text is then stored in retrievable manner.

FIG. 2b is a screen-shot of the newspaper from FIG. 2a after reflow and shown side-by-side with the original for comparison purposes. The resultant page thus reproduced mimics the original, print-medium newspaper in both structure and key elements and displays all the objects—text and graphics—on the page and in the location where they originally appeared. Body-text is flowed back into this digital version of the original to provide an immediately readable web-page which gives a user a preview of the entire page with all its articles. A reader can thus see at a glance and read all the articles and features of an online newspaper page.

Due to the use of larger size fonts, generally only the beginning body-text of longer articles may be visible. It is a well-known journalistic practice to place the essential facts and main ideas in news articles at the beginning and this practice also has been carried over to other types of writing in most publications. All body-text may be enlarged, but the reconstituted body-text fills the same location in the online version as in the original print-medium page with some immediately visible and other text hidden. The hidden text may be accessible using common and intuitive user interactions and navigational tools, such as embedded arrowheads and cursor movements, such as "mouse-over," i.e., hovering the cursor over, which are known to those skilled in the art.

Banner header 38 is shown much as in the print-medium original of the newspaper (see FIG. 2a) containing the newspaper logo, "The Washington Post" and the structural and logical textual elements of a print-edition newspaper. The general layout and formatting closely follows that of the original, including a display of the full front-page regardless of the size of the original paper, whether folio or some other size format. The text font has been enlarged and reflowed from saved digital files into the segmented areas in the online webpage. A cursory comparison between the text from FIGS. 2a and 2b, shown for convenience side-by-side, clearly reveals that the text has been enhanced for immediate readability, albeit, some text has been hidden because of the font rescaling, but this latter text can be easily displayed with a minimum of effort on the part of a reader.

Because there is far more information in a conventional newspaper than most people choose to read, the present embodiments may provide a variety of convenient navigational tools, as are known to those skilled in the art, to enhance the reading experience and make selection of reading matter both user-friendly and ergonomic, as will be discussed in respect of FIGS. 4, 5, and 6 below.

A user can recognize the familiar layout of the original print-medium publication. It should be noted that structural features such as box borders 44, horizontal lines 46, and column dividers 48 help a user to recognize some of the common stylistic elements of popular publications as well as aid in separating items of reading interest. Some news is presented which occupies filler positions as, for example, the brief topics 42 listed in one column at the extreme right of the page.

Figure 2C:
FIG. 2c shows in outline form the original layout of the full front page of the newspaper shown in FIG. 2a prior to reflow, illustrating an intermediate step in the manipulation of text and photos resulting in the reconstituted webpage shown in FIG. 2b.

FIG. 2c shows in outline form the original layout of the full front page of the newspaper shown in FIG. 2a prior to reflow, illustrating an intermediate step in the manipulation of text and photos resulting in the reconstituted webpage shown in FIG. 2b.

In this intermediate step, items have been identified, certain text such as headline text has been fixed and item boundaries are identified and fixed, ready for article text flow into the available spaces.

More particularly, body-text and photos (see FIGS. 2a and 2b) have been removed and stored in digital files for later reflow in accordance with predetermined rules. Note the logo banner 38 of the original print-medium publication which is retained so as to immediately identify the source as from the original print-medium, newspaper publication.

Major features common to most print-medium newspapers (and to some periodical publications) and retained in the intermediate step as shown in FIG. 2c include: a banner headline 36; a banner header 38; and article headlines and sub-headlines 40. It should be noted that structural features such as box borders 44, horizontal lines 46, and column dividers 48 are not reflowed but maintained in the same relative locations as in the original print-medium publication (see FIG. 2a). Some captioned news headers 42 are also retained in situ.

FIG. 3A is a schematic flowchart showing the stages in the method of the present embodiments. In a preferred embodiment of the present invention, for each page of an original print-medium publication, the layout is parsed. In simplified terms, an analysis may be made of the various rectangular areas. In a stage 340 the page layout is parsed and entities are inferred. The areas, once categorized into separate entities, may then be parsed to determine related logical elements and structural elements such as headlines and article text belonging to the same article, as in block 341.

In block 342 body-text of news articles, photos, and other major graphic objects are removed and stored in separate digital files. In block 343, reflow rules are provided for selected entities and their related logical elements within the print-medium page. and folders for later reflow of the body text etc, in accordance with the predetermined rules. Stored articles and advertisements from the original newspaper page may be scaled with the same proportion to maintain the layout of the original print-medium page layout when transposed to the online web edition. However, different logical elements of articles, e.g. body-text, captions, and the like) may scaled and/or reflowed according to different predetermined rules.

Other textural elements, such as the author, the subtitles of some smaller articles, and the captions of any pictures accompanying the articles on the web-page may be reflowed in the same way.

In the next stage, at block 345, reflow is carried out to fit the relevant area as in the original (FIG. 2a) with text, but at an optimum size for readability (see FIG. 2b).

There is thus provided a web-page containing reflowed text which is readable, but still retains the layout of the original print-medium page.

Subsequent user interaction with the item on the page allows for the remaining text of the article to be retrieved by dynamic flow.

Figure 3B:
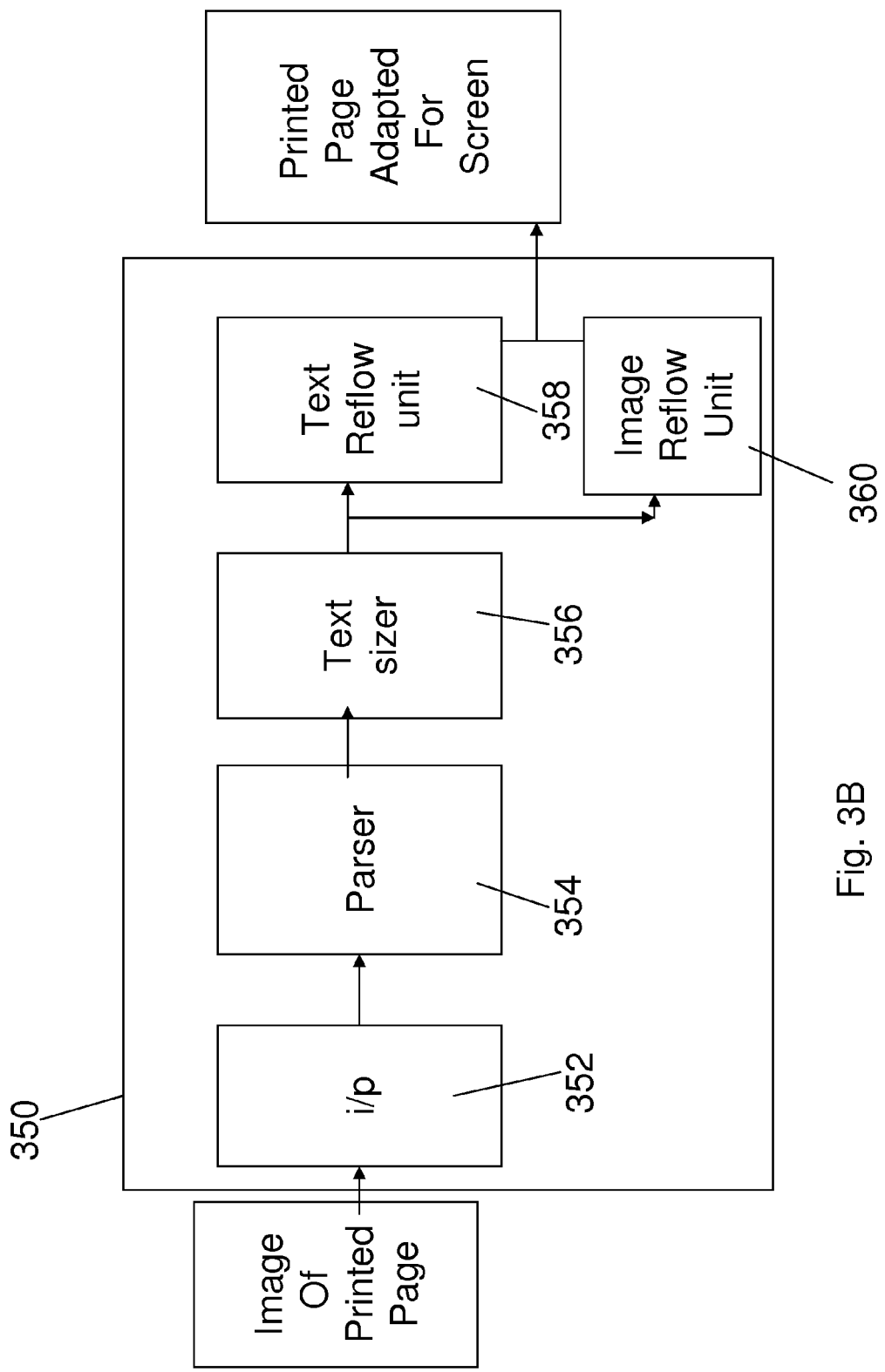
FIG. 3B shows an apparatus for converting an image of a page proportioned for a print edition into an image having the same layout but with text proportioned for an electronic screen.

Reference is now made to FIG. 3B, which is a simplified schematic diagram that illustrates a computerized apparatus 350 for providing an electronic screen version of a print publication. The electronic screen version is a version of the print page which is adapted for reading from a screen. The apparatus may carry out the conversion using an electronic processor. The electronic processor may comprise an input 352 which obtains an electronic image of a page of the print publication. The page may include multiple items arranged in a print version layout as has been discussed above, the items for example including a page banner, headlines, pictures and articles, all having respective boundaries within the overall layout of the page.

A layout parser 354 parses the page layout, identifying the various items and their respective boundaries with the layout, and identifying which text on the page belongs to which of the items.

A text sizing unit 356 then selects text sizes for the different items. The sizes selected primarily serve the purpose of rendering the text readable when the text is shown on screen as part of the page. A secondary purpose of selecting the text size is to retain size differentials between different types of text. Thus headlines may always be larger than sub-headlines and sub-headlines larger than article text.

After the text is resized, the normal state is that not all of the resized text can appear simultaneously within the item boundaries. However what does appear is readily readable. Furthermore, a text flowing unit 358 flows text of a respective item on the page through the corresponding boundaries as the user indicates that his attention is focused on that item, so that the reader can obtain the rest of the text once his interest has been aroused. Thus the boundaries may become the boundaries of a dynamic flowing text, or alternatively the boundaries of the given item may enlarge when focused on. Hence an electronic screen version of the image of said page is provided. The screen version retains the layout of the print version but has text which is sized to be readable when shown on a screen.

In an embodiment, the screen version may be prepared per individual end user. The text sizing unit may obtain feedback over a network from an end user indicating his screen size. The text sizes may then be chosen specifically to suit the end user's screen.

The text flowing unit may fill respective boundaries of a given item with text, and may retain remaining, currently hidden text for later flowing into the boundaries following user interactions, such as hovering over the item, or operating a scroll bar, or any other suitable user interaction.

The text flowing may involve enlarging the boundaries of a given item in response to interaction with a user.

An image flowing unit 360 may fulfill a similar function for an image item. The initial page may include several images, which would be too small if shown on the screen. Thus only a subset, typically one, of the images is initially shown within the item boundaries. The image is then exchanged with other images following user interaction.

The page may for example be a newspaper or magazine page.

Article items may comprise body text and captions. Body text and caption text may be treated separately for reflowing, say according to different reflowing rules, and the same may apply to text size.

Figure 4A:
FIGS. 4a and 4b are screen-shots of the upper portion of a front page and an "inner" page, respectively, of the print-edition of the online newspaper from FIG. 2b showing a side bar used, when online, for navigating to other web-pages within the website in accordance with a preferred embodiment of the present invention.

FIG. 4a is a view of the website of the print-edition of the online newspaper from FIG. 2b showing a screen-shot of a portion of the front page having a side bar for online navigating to other web-pages within the website, for example corresponding to specific sections within the newspaper, in accordance with an embodiment of the present invention.

Additional navigation tools are conveniently provided in tabs and boxes as shown in a GUI sidebar 54 comprising standard navigation buttons as are known to those skilled in the art. Other navigation tools described hereinafter in reference to FIGS. 5-6, are embedded in convenient locations on the webpage 50 so as to be user-friendly.

The online print-edition website 50 is identified by the logo banner 38 including the name, "The Washington Post". Sidebar 54 includes well-known features such as a page dialog box 51 and adjacent "Go" button which indicates that page "1" has been selected for display and reading. The navigation sidebar 54 allows a user to move forward 53 or backward 55 (shown by block arrows) through the publication published on the webpage or to move to another webpage using the page dialog box 51 to move to, for example, an inner webpage of the online print-edition newspaper (see FIG. 4b). A Help button 57 is provided for further guidance for online readers.

Many other combinations of tools can be used for like purposes as is known to those skilled in the art. In a preferred embodiment of the method of the present embodiments, an index of sections 59 provides readers with quick and direct access to a favorite newspaper section, such as "National News", "World News", and the like without having to move through each webpage of the full online newspaper 50.

Figure 4B:

FIG. 4b is an exemplary screen shot of an inner page of the newspaper, in this case the second page of the newspaper from FIG. 4a. The page is arrived at for example using the side bar page dialogue box 51, and one option provided is a Go button 51 to search for page "2". Note that logo 38, which is proprietary, is clearly shown along with the date of publication. The side bar 54 allows return to a previous page or moving forward.

It should be noted that the advertisements 52 shown at the bottom of page 2 as in FIG. 4b need not be reflowed, but may be copied in whole into their original locations on the page.

FIGS. 5 a-f show enlarged screen-shots of a typical article from the online print-edition of the newspaper shown in FIG. 4a with various features for enhancing readability and displaying additional textual information or photographs.

Figure 5A:
FIGS. 5 a-f show enlarged screen-shots of a typical article from the online print-edition of the newspaper shown in FIG. 2b with various features for enhancing readability and displaying additional textual information or photographs in accordance with the principles of the present invention.

FIG. 5a is an enlarged screen-shot display of a typical article selected for reading by a hypothetical reader from the online print-edition of the newspaper shown in FIG. 4a. The article leads with a headline 40, a sub-heading 56, a by-line 58, and a photo 60 with a caption (partially hidden) 62. A horizontal bar 46 marks the lower border of the article indicating the limit of the body text to be displayed in that area of the page.

Forward arrowhead 64 embedded in the margin at the limit of the displayed text (indicated by horizontal bar 46) indicates forward scrolling capability of the body-text. While hovering on forward arrowhead 64, a pop-up balloon (not shown) prompts the reader to press and hold the cursor to initiate rapid scrolling within the boundaries of the article which displays the next portion of hidden body-text for reading. Repeated pressing of the forward arrowhead 64 continues to yet another portion of body-text until the reader has reached the end of the article. In any display of an article other than the first portion as in FIG. 4a, a reader has the option to use a back arrowhead 66 (see FIG. 5c) to return to a prior portion of the article.

Figure 5B:
Figure 5C:
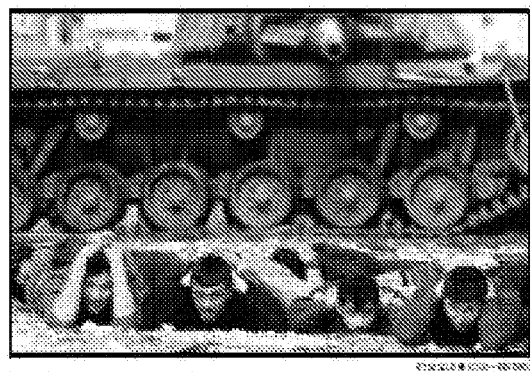

Alternatively, when a reader places his cursor over, or hovers over, a portion of body-text, the body-text may slowly scroll automatically to display the hidden continuation of the next portion of the article (see FIGS. 5b and 5c).

Forward arrowhead 68, positioned in the right center margin of photo 60, indicates an option to display another photo (see FIG. 5d) related to the topic of photo 60. A stylized arrowhead 76, when activated, brings up a pop-up text-box 78 (see FIG. 5f) displaying a full photo caption. Alternatively, while hovering on arrowhead 76, a reader is provided automatically with pop-up text box 78 comprising the full photo caption.

Another stylized arrowhead 70, when activated, brings up a pop-up text box 80 (see FIG. 5e) with additional information on the by-line. Alternatively, while hovering with the cursor over arrowhead 70, a reader is provided automatically with pop-up text box 76 comprising additional information on the by-line.

A section reference 78 provides a reader with the option to seek similar articles of interest on the current topic or related topics from the same geographical area ("Mideast") as the source of the news when these are available within the current newspaper website, but located in another section or other web-pages (not shown). Clicking on the section reference is the equivalent of the turning of pages to a new section in a print-medium newspaper, and in the online newspaper, the reader is provided with a new web-page displayed from the section specified. Section reference 78 is provided in each screen-shot of the continuation of a particular article for convenient browsing at any time, while reading.

FIGS. 5b and 5c are screen shots of further continuations of the article of FIG. 5a. In FIG. 5b, both a forward arrowhead 64 and a return arrowhead 66 are provided to continue reading the article or to return to a prior section, respectively. Since FIG. 5c nominally displays the conclusion of the article, only a return arrowhead 66 is provided for the article.

Note that photo 60 is provided with a forward arrowhead 68 centered in the right margin. This indicates to a reader that one or more hidden photos on the same or related topic is available by clicking on forward arrowhead 68. An example of this is photo 72 in FIG. 5d.

Figure 5D:
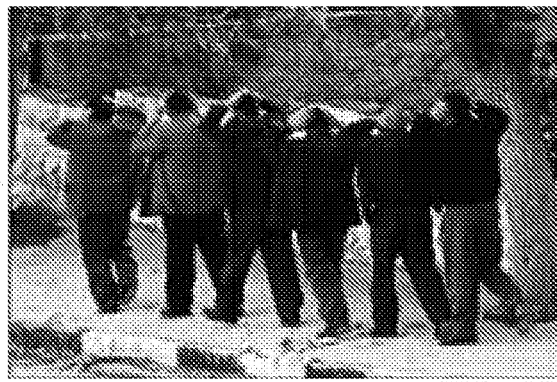

FIG. 5d displays photo 72 in place of the original from FIGS. 5a-c. Photos may be viewed as slide shows of alternate photographs related by topic to the first viewable photograph and which fill the same segmented area. The alternate photos remain hidden until called up by clicking on embedded photo arrowheads 68, 74 (see also FIG. 5a) to move to another slide, forwards or backward, respectively. The arrowheads themselves indicate if there are alternative photos associated with the one displayed. Mouse-over any photo reveals the source, photographer's name and affiliation in a text box (not shown) which is normally hidden from view.

Mouse-over movement above a photograph displays additional information related to the particular photograph, such as the name and affiliation of the photographer, which may be displayed within a pop-up text box (not shown).

Figure 5E:

FIG. 5e shows an enlarged screen-shot illustrating a pop-up text box 76 for the newspaper article by-line 58 of FIG. 5a. By-lines for major articles on the website usually give only the names of the author/writer/editor, but hovering over the text of by-line 58 reveals the reporter's name and news affiliation in a pop-up text box 76 which is normally hidden. Alternatively, pop-up text box 76 is displayed when stylized arrowhead 70 (see FIG. 5a) is activated by a reader to provide the accreditation of the writer of the news article.

Figure 5F:
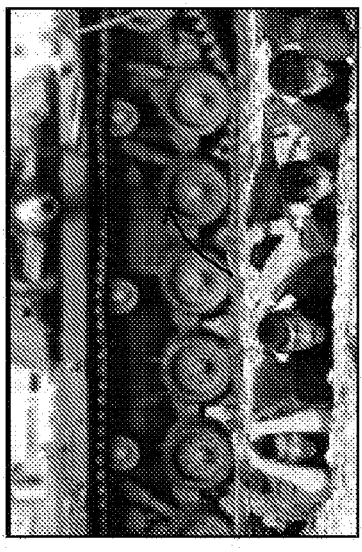

FIG. 5f shows an enlarged screen-shot illustrating a pop-up text box 80 for the photo caption 62 (see FIG. 5a) called out when a reader presses and holds a cursor over the arrowhead. Mouse-over photo caption 62 also displays pop-up text box 80.

FIG. 6 is a screen-shot of a typical article displayed in a new zoomed window comprising enlarged boundaries, according to an alternative method of reading from the online newspaper.

For example, utilizing mouse-over on a portion of body-text of newspaper 82, activates an automatic zooming function for the selected article which now fills expanded area 84. The article on the initial page is as before with enlarged and reflowed text, but when the user shows interest, the boundaries of the article are enlarged as shown to reveal hidden text.

As explained hereinbefore, the present embodiments may use conventional symbols-embedded indicators, such as arrowheads—selectively placed within the web-page version of a print-publication, which allow a reader to obtain more information by efficiently navigating the web-site and moving from one article or logical element to another with a minimum of effort.

For captioned, short, news items, the mouse-over movement above visible text portions within some areas on the webpage effects slow-paced scrolling suitable for reading the visible text and for exposing hidden text, constituting continuation of text material not immediately visible due to the increase made in the font size of the original text.

Alternatively, a reader may click anywhere on the body-text of an article to bring up enlargement 84 of the same article in enlarged boundaries. Thus the user may be saved entirely or partially from scrolling. Scrolling, where necessary may be facilitated by conventional scroll bars.

According to the layout and formatting of the web-page, either enlarging or scrolling may be the choice method for reading an article, depending on the predetermined rules to be applied to the reflow of the particular article.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for providing an electronic screen version of a print publication, the print publication having at least one page, said at least one page having a multi-element layout, the electronic screen version being adapted for reading from a screen, the apparatus comprising an electronic processor, the electronic processor comprising:

an input for obtaining an electronic image of a page of said print publication, the page comprising a plurality of items arranged in said multi-element layout, the multi-element layout being a two dimensional layout of said items in said page characterized by print version boundaries separating between said items;

a layout parser adapted to parse said page layout, said parsing comprising identifying said items arranged therein, said identifying comprising identifying said print version boundaries of said items within said layout, and text belonging to said items;

a text sizing unit adapted to select text sizes for respective items, said text sizes being variable with respect to said layout, said sizes to render said items to be readable when the text is shown on screen as part of said page, and a text flowing unit operatively connected to said text sizing unit and adapted to flow text of a respective item on said page at any one of said selected text sizes into screen version boundaries of said respective item, thereby to fill a space between said screen version boundaries with more or less text of said respective item depending on a respectively selected text size, said screen version boundaries corresponding to said print version boundaries to form said multi-element layout in said screen version, said boundaries defining each item on said page such that said flowing occurs within said boundaries on said page, wherein said items comprise body text and captions being separate ones of said elements, and wherein text belonging to each one of body text and captions are arranged for reflowing according to respectively different predetermined rules, thereby to provide an electronic screen version of said image of said page, retaining said multi-element layout and having text within said layout and said boundaries which are sized to be readable when said layout is shown on a screen.

2. The apparatus of claim 1, wherein said text sizing unit is configured to use feedback from an end user indicating an end user screen size, in order to select a text sized for a respective end user screen.

3. The apparatus of claim 1, wherein said text flowing unit is adapted to fill said respective identified boundaries of a given item with text, and to retain remaining text associated with said respective item for later flowing into said boundaries following user interaction.

4. The apparatus of claim 3, wherein said user interaction comprises scrolling.

5. The apparatus of claim 3, wherein said user interaction comprises hovering over said given item with a cursor.

6. The apparatus of claim 1, wherein said text flowing unit is adapted to enlarge respective identified boundaries of a given item in response to interaction with a user, and said item boundaries into which said text is flowed are said enlarged boundaries.

7. The apparatus of claim 1, further comprising an image flowing unit, adapted to show a subset of images of a respective image item on said page at a selected size within corresponding boundaries and to exchange said subset with other images of said image item following user interaction with said item.

8. The apparatus of claim 1 wherein said page is a newspaper page and said plurality of items comprise each of headlines, pictures and articles.

9. The apparatus of claim 8, wherein text belonging to each one of body text and captions are assigned respective sizes according to respectively different predetermined rules.

10. Apparatus for providing an electronic screen version of a print publication, the print publication having at least one page, said at least one page having a multi-element layout, the electronic screen version being adapted for reading from a screen, the apparatus comprising an electronic processor, the electronic processor comprising:

an input for obtaining an electronic image of a page of said print publication, the page comprising a plurality of items arranged in said multi-element layout, the multi-element layout being a two dimensional layout of said items in said page characterized by print version boundaries separating between said items;

a layout parser adapted to parse said page layout, said parsing comprising identifying said items arranged therein, said identifying comprising identifying said print version boundaries of said items within said layout, and text belonging to said items;

a text sizing unit adapted to select text sizes for respective items, said text sizes being variable with respect to said layout, said sizes to render said items to be readable when the text is shown on screen as part of said page, and a text flowing unit operatively connected to said text sizing unit and adapted to flow text of a respective item on said page at any one of said selected text sizes into screen version boundaries of said respective item, thereby to fill a space between said screen version boundaries with more or less text of said respective item depending on a respectively selected text size, said screen version boundaries corresponding to said print version boundaries to form said multi-element layout in said screen version, said boundaries defining each item on said page such that said flowing occurs within said boundaries on said page, thereby to provide an electronic screen version of said image of said page, retaining said multi-element layout and having text within said layout and said boundaries which are sized to be readable when said layout is shown on a screen, the apparatus further comprising The apparatus of claim 1, further comprising an image flowing unit configured to display a subset of images of a respective image item on said page at a selected size within corresponding boundaries and to exchange said subset with other images of said image item following user interaction with said item.

11. Computerized method for converting an image of a print version of a multi-element page, the page having a layout, to a screen version of said page, the screen version being adapted for reading from an electronic screen while retaining the layout, the method comprising:

obtaining an electronic image of a multi-element page of said print publication, the page comprising a plurality of items, at least some of said items comprising elements, the items and elements arranged in a respective page layout, the respective page layout being a two-dimensional layout of said items and elements within said image, the respective layout comprising print version item boundaries, respective items being located within corresponding boundaries to form said respective two-dimensional layout;

parsing said page layout, said parsing comprising identifying said items arranged therein, said identifying comprising identifying said print version item boundaries of said items within said layout, and text belonging to said items;

selecting text sizes for respective items, said sizes being variable with respect to said layout to render said items to be readable when the text is shown on screen as part of said page, flowing text of a respective item on said page at any of said selected text sizes into a space between said item boundaries, said flowing providing more or less text of said item depending a respectively selected current text size, said item boundaries forming a two-dimensional screen layout being the same as said respective layout, the boundaries defining a screen version of said page such that said flowing occurs for each item separately within respective boundaries on said page, varying text sizes for respective items individually to be readable when said layout is shown on a screen, and image flowing, said image flowing comprising showing a subset of images of a respective image item on said page at a selected size within corresponding boundaries and exchanging said subset with other images of said image item following user interaction with said item.

12. The method of claim 11, wherein said text sizing uses feedback from an end user indicating an end user screen size, in order to select a text sized for a respective end user screen.

13. The method of claim 11, wherein said text flowing comprises filling respective item boundaries of a given item with text, and retaining remaining text associated with said respective item for later flowing into said boundaries following user interaction.

14. The method of claim 13, wherein said user interaction comprises scrolling.

15. The method of claim 13, wherein said user interaction comprises hovering over said given item with a cursor.

16. The method of claim 11, wherein said text flowing comprises enlarging respective image boundaries of a given item in response to interaction with a user to form said item boundaries and flowing currently hidden text into said enlarged item boundaries.

17. The method of claim 11, said image flowing comprising showing one image of said respective image item on said page at a selected size within corresponding boundaries and exchanging said image with other images of said image item following user interaction with said item.

18. The method of claim 11, wherein said page is a newspaper page and said plurality of items comprise each of headlines, pictures and articles.

19. The method of claim 18, wherein said articles comprise body text and captions and wherein text belonging to each one of body text and captions are arranged for reflowing according to respectively different predetermined rules.

20. The method of claim 18, wherein said articles comprise body text and captions and wherein text belonging to each one of body text and captions are assigned respective sizes according to respectively different predetermined rules.

* * * * *